Inventor
Harry D Elliott
By his Attorney

Nov. 9, 1948.  H. D. ELLIOTT  2,453,212
TAPE APPLYING MACHINE FOR USE IN THE
MANUFACTURE OF SHOES
Filed Feb. 12, 1947  3 Sheets-Sheet 3
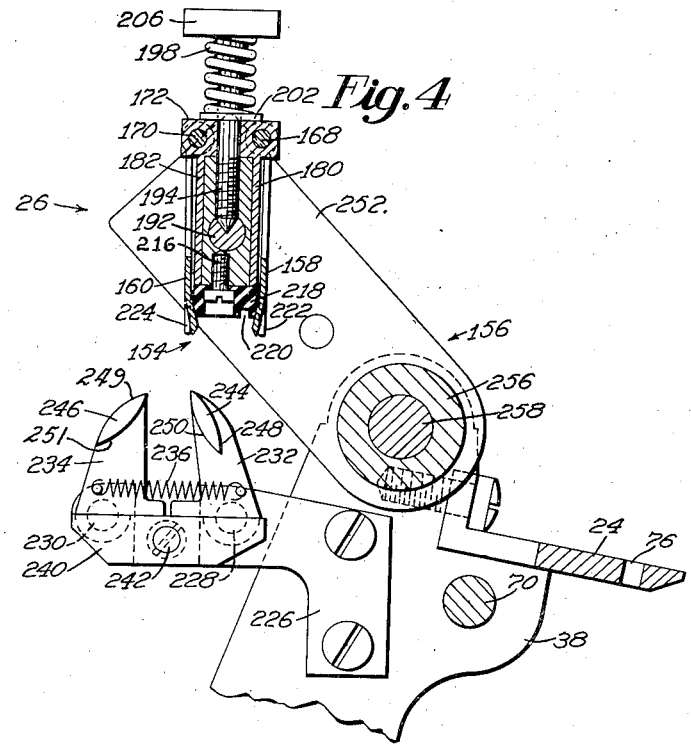
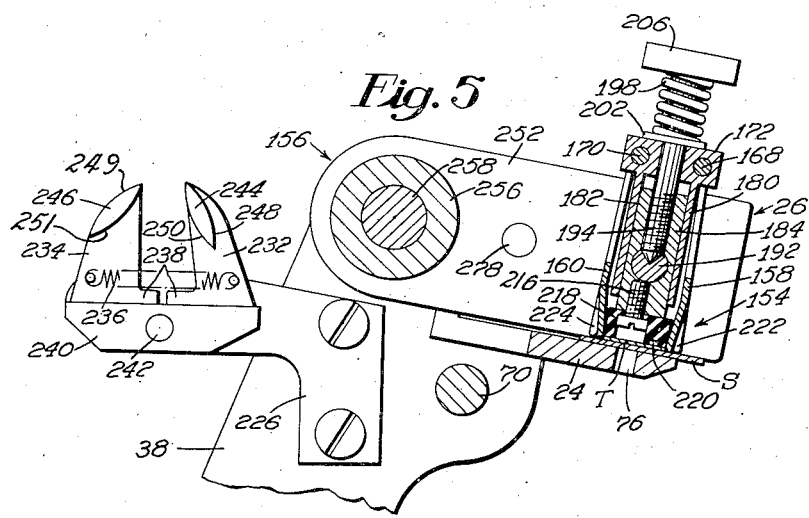
*Inventor*
Harry D. Elliott
By his Attorney

Patented Nov. 9, 1948

2,453,212

UNITED STATES PATENT OFFICE 2,453,212

TAPE APPLYING MACHINE FOR USE IN THE MANUFACTURE OF SHOES

Harry D. Elliott, Wenham, Mass., assignor to United Shoe Machinery Corporation, Flemington, N. J., a corporation of New Jersey Application February 12, 1947, Serial No. 728,039

3 Claims. (Cl. 12—59.5)

1

This invention relates to a tape applying machine for use in the manufacture of shoes and is herein described as embodied in a machine for applying reinforcing tape to shoe parts. For an example of a machine of this type, reference may be had to United States Letters Patent No. 2,383,539, granted August 28, 1945, on the application of Joseph Fossa. Such machines, as disclosed in said patent, are organized to draw a predetermined length of tape from a reel, support the length of tape above a receptacle containing adhesive, apply adhesive from the receptacle to the under surface of the supported tape, sever the tape, transfer the length of tape to a work piece on a work table, and apply it to the work piece.

It is an object of the present invention to provide an improved machine of the type under consideration which is of simple construction and which is convenient to operate. In accordance with a feature of the invention, the work table of the illustrated machine is inclined at an angle convenient to the operator and the mechanism for transferring the tape from the locality at which the adhesive is applied to it is arranged to tilt the tape to an inclination corresponding to that of the work table. The transferring mechanism is provided with a pair of jaws for grasping the tape by its lateral edges and with a cam device for opening the jaws to enable them to grasp the tape, whereupon the cam device releases the jaws and permits them to close upon the tape.

Certain features disclosed but not claimed herein are included in the subject matter of my copending application Serial No. 763,561, filed July 25, 1947, as a continuation-in-part of the present application.

The several features of the present invention, including various novel details of construction and combinations of parts, will now be more particularly described by reference to the accompanying drawings and pointed out in the claims.

In the drawings,

Fig. 4 is a sectional view through the tape-transfer mechanism taken on the line IV—IV of Fig. 3; and Fig. 5 is a view similar to Fig. 4 showing the tape-grasping device in position for applying the tape to a work piece.

Figure 1:
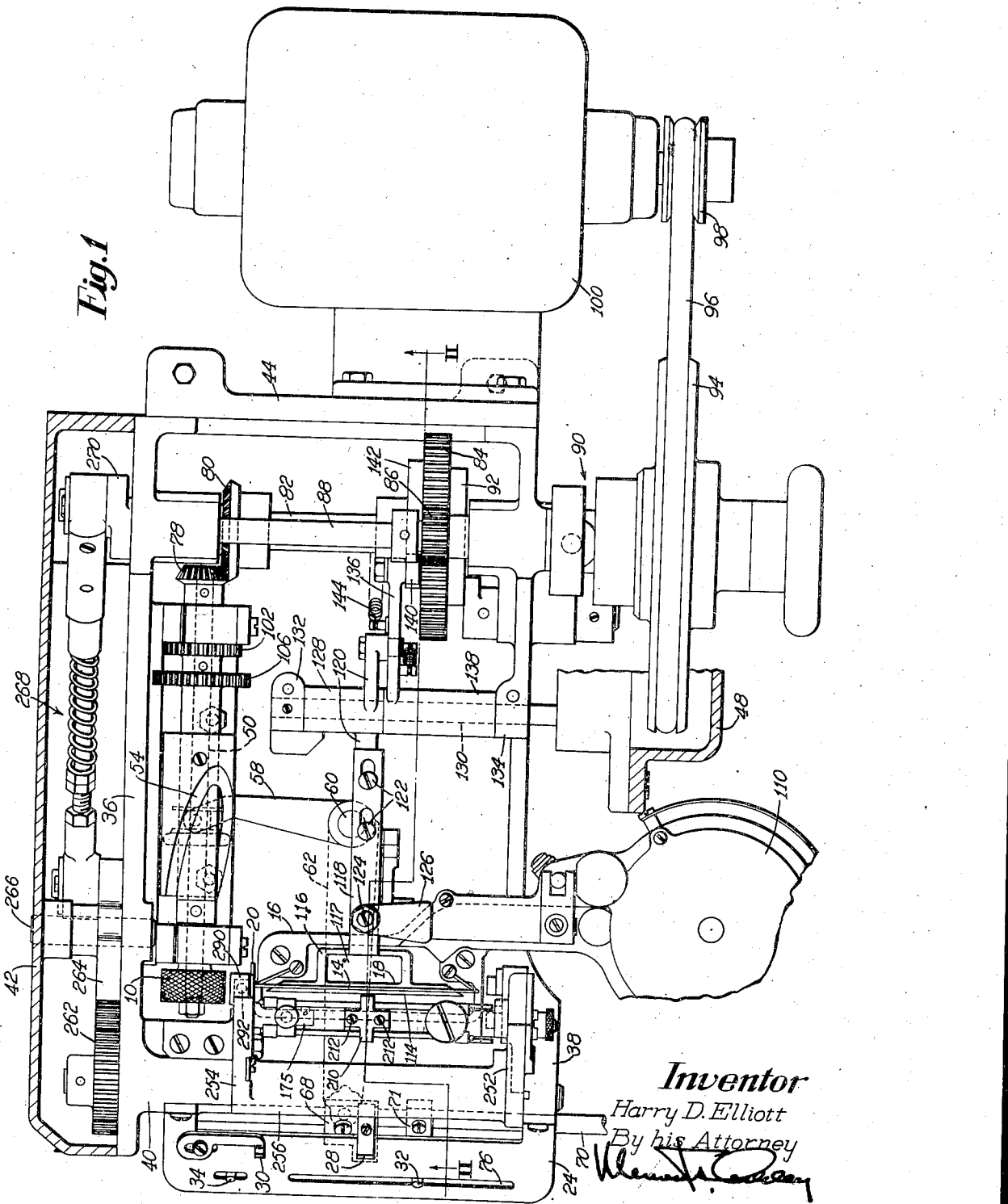
Fig. 1 is a plan view with the cover removed of an illustrative machine embodying the invention.

The tape engaging instrumentalities of the illustrated machine comprise an upper feed roll 10 (Figs. 1 and 2) and a lower feed roll 12 cooperating therewith to feed a predetermined length of tape T (Fig. 5) transversely of the machine, a horizontal wire 14 for supporting the tape thus fed above a receptacle 16 which contains a liquid adhesive, an applicator 18 for raising a quantity of adhesive from the receptacle and applying it to the under surface of the supported tape, and a pair of cutting blades 20 and 22 for severing the length of tape. The shoe part engaging instrumentalities comprise a work table 24 for supporting a shoe part S (Fig. 5) to which the adhesively coated and severed length of tape is moved by a transfer mechanism 26 from its position on the wire 14 to a forward position on the shoe part, a pair of gages 28 and 30 engageable with the rear edge of the shoe part, a gage 32 engageable with the right edge of the shoe part, and a gage 34 engageable with the left edge of the shoe part. The tape in its passage to the feed rolls 10 and 12 is drawn from a reel and through a guide, neither of which is shown herein, the guide being in all respects similar to the guide designated by the numeral 270 in Letters Patent No. 2,383,539, above mentioned. The tape as it is fed from the rolls 10 and 12 and supported by the wire 14 extends in a horizontal plane while the work table 24 is inclined from the horizontal at an angle convenient to the operator. The transfer mechanism 26, as will later be explained, is constructed and arranged to grasp the tape in its horizontal position and, as it transfers the tape, to tilt the tape to an angle corresponding to that of the work table.

The supporting structure of the machine comprises a rigid housing 36 in the form of a base plate adapted to be secured upon a work bench and having integral front, rear and side walls. On the right wall is an upstanding arm 38 and on the left wall is a bearing lug 40, the table 24 being secured to the arm 38 and the lug 40. The housing 36 is further provided with left, rear and top cover plates 42, 44, and 46, respectively. An additional housing 48 (Fig. 1) at the right of the machine is provided for such portions of the drive mechanism as otherwise would be exposed.

Figure 2:
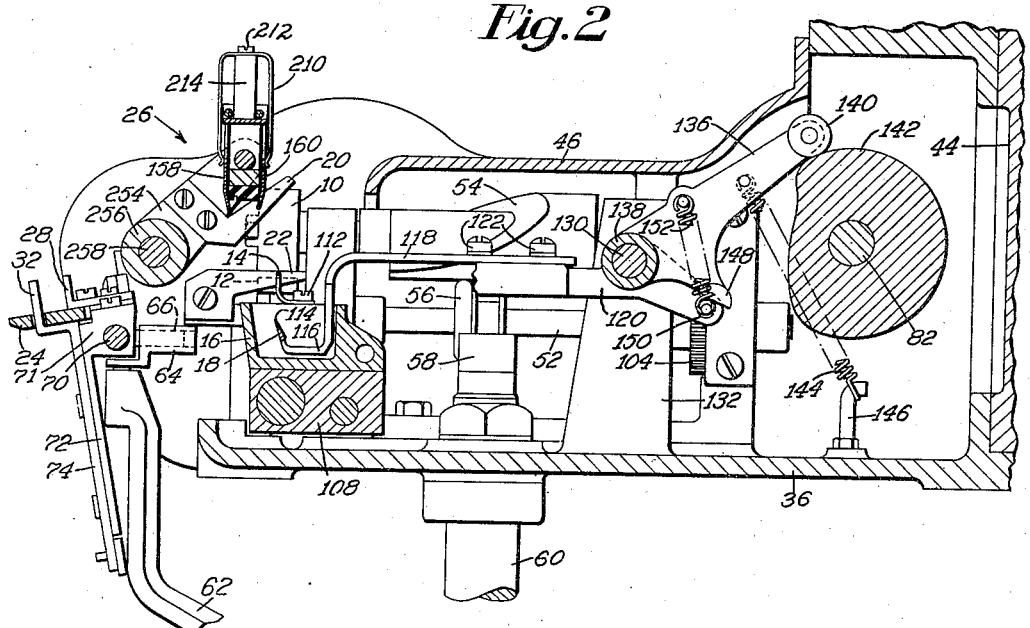
Fig. 2 is a longitudinal vertical section of the machine on the line II—II of Fig. 1.

The upper feed roll 10 is mounted upon a shaft 50 (Fig. 1) which rotates freely in fixed bearings carried by the left-hand side wall of the housing 36. To feed in a length of tape corresponding to the size of the work piece, the lower feed roll 12 is mounted upon a shaft 52 (Fig. 2) which is arranged for heightwise movement of the lower feed roll toward and from the upper feed roll to cause the tape to be intermittently gripped and released. The heightwise movement of the lower feed roll 12 is controlled by a cam 54 formed on a sleeve rotatable upon the shaft 50 and engaged by a cam follower 56 on the shaft 52. Different lengths of tape are fed as the cam follower 56 is shifted axially along the shaft 52 by an arm 58 extending from the top of a shaft 60 (Fig. 2). Extending from the bottom of the shaft 60 is an arm 62, the outer upstanding end of which pivotally supports a block 64 having a sliding connection with a pin 66 extending rearwardly from a block 68, shown on Fig. 1 (not on Fig. 2). The right rear edge gage 28 is secured to the block 68. Secured by a setscrew to the block 68 is a rod 70 extending transversely of the machine and slidable in bearings formed in the housing portions 38 and 40.

Carried by a block 71 secured by a setscrew to the rod 70 is a downwardly extending guide 72 for a slide 74 which, at its upper end, carries the right-hand edge gage 32 projecting upwardly through a slot 76 in the work table 24. The slide 74 is normally held by a spring (not shown) in an upper stop position from which it can yield downwardly when the transfer mechanism applies the tape to the shoe part. The operator places the shoe part on the work table with its left-hand edge against the gage 34 and then, through a knee lever (not shown), turns the shaft 60 to bring the gage 32 against the right-hand edge of the shoe part. Such turning of the shaft 60 adjusts the cam follower 56 to cause the rolls 10 and 12 to feed a proper length of tape for the next operation, and it also, through mechanism operated by the rod 70 and not shown herein, changes, in accordance with the setting of the gage 32, the amount of tape fed during the prior operation. This change is effected by advancing additional tape, or by withdrawing surplus tape, between the separated feed rolls. The arrangements for controlling the feed rolls 10 and 12 to provide for any predetermined length of tape in accordance with the setting of the gage 32, and the arrangements for changing the length of tape already fed before the resetting of the gage, are similar to corresponding arrangements disclosed in Letters Patent No. 2,383,539, above mentioned, to which reference may be had for their more complete disclosure. The arrangement in the illustrated machine differs from that disclosed in said patent, however, to the extent that, in the illustrated machine, it is the lower feed roll rather than the upper which is heightwise movable.

The shaft 50 is driven through a pair of bevel gears 78 and 80 (Fig. 1) from a countershaft 82 (see also Fig. 2) which, in turn, is driven through a gear 84 and a pinion 86 from a drive shaft 88. An automatically disengaging clutch 90, including a cam 92, couples a pulley 94 to the drive shaft 88 to cause the machine to be driven through a single cycle of operations. The pulley 94 is driven through a belt 96 from a pulley 98 mounted upon the shaft of a motor 100. The shaft 52 for the lower feed roll 12 is driven by gears 102 (Fig. 1) and 104 (Fig. 2) from the upper feed roll shaft 50. The sleeve of the cam 54 carries a gear 106 (Fig. 1) by which it is driven, at half the speed of the shaft 50, from a gear (not shown) on the lower feed roll shaft 52.

The receptacle 16 (Figs. 1 and 2) is supported on a heated block 108 mounted within the housing 36 and is supplied with a thermoactive adhesive, liquid when hot, from a container 110 by any desired constant level arrangement, such, for example, as that disclosed in Letters Patent No. 2,383,539. The tape supporting wire 14 is secured to the receptacle 16 by screws 112. The applicator 18 comprises a bar extending lengthwise of the container (i. e., transversely of the machine) and having a horizontal top edge 114 which, when the applicator is raised out of the adhesive within the receptacle 16, comes into contact with the under surface of the supported tape and thus applies adhesive to the tape while the tape is held down on the wire 14 by the transfer device 26. The applicator 18 is integral with a bracket 116 which, in plan view (Fig. 1), is rectangular with a rectangular central opening 117, and which, in side elevation (Fig. 2), is seen to bend down below the surface of the liquid adhesive in the receptacle 16, then forward, and then up to the ends of the applicator 18 which constitutes its forward portion. The bracket 116 has a rearwardly extending shank 118 by which it is mounted upon a lever 120. A pair of screws 122, extending through slots in the shank 118 which provide for forward and rearward adjustment, secure the shank 118 to the lever 120. A stop screw 124 (Fig. 1), threaded downwardly through a lug 126 extending from a stationary portion of the machine, engages the shank 118 to limit the upward movement of the applicator. The lever 120 has a hub 128 by which the lever is pivotally mounted upon a stationary shaft 130. A post 132 rising from the base plate of the housing 36 supports one end of the shaft 130, and a boss 134 on the right-hand side wall of the housing supports the other end of the shaft. The shaft 130 is also utilized to support the housing 48.

The mechanism for operating the applicator 18 comprises a lever 136 having a hub 138 which is freely rotatable upon the shaft 130. Carried upon the free end of the lever 136 is a cam roll 140 engageable with a cam 142 secured upon the countershaft 82. A spring 144 secured at its upper end to the lever 136, and anchored at its lower end to a hook 146 secured in the housing 36, normally holds the roll 140 in engagement with the cam. Formed upon the lever 136 is a lug 148 engageable with a lug 150 extending laterally from the lever 120. A tension spring 152 connected at its ends to the levers 120 and 136, respectively, normally holds the lugs 148 and 150 in engagement with each other. The construction just described serves to prevent danger of breakage when the adhesive, liquid only while hot, is congealed in the receptacle 16. For example, if the applicator 18, while in its lowermost position as shown in Fig. 2, is embedded in a mass of congealed liquid, the rotation of the cam 142 will bring the low portion of the cam beneath the roll 140, but will not cause breakage because the spring 144 will exert its force yieldingly upon the lever 136 without bringing the cam roll into engagement with the low portion of the cam. If, on the other hand, the applicator 18 should be in its uppermost position above a mass of congealed adhesive, the rotation of the cam 142, while positively forcing the lever 136 up, will not forcibly move the lever 120 because the spring 152 will yield and permit the lugs 148 and 150 to separate.

Figure 3:
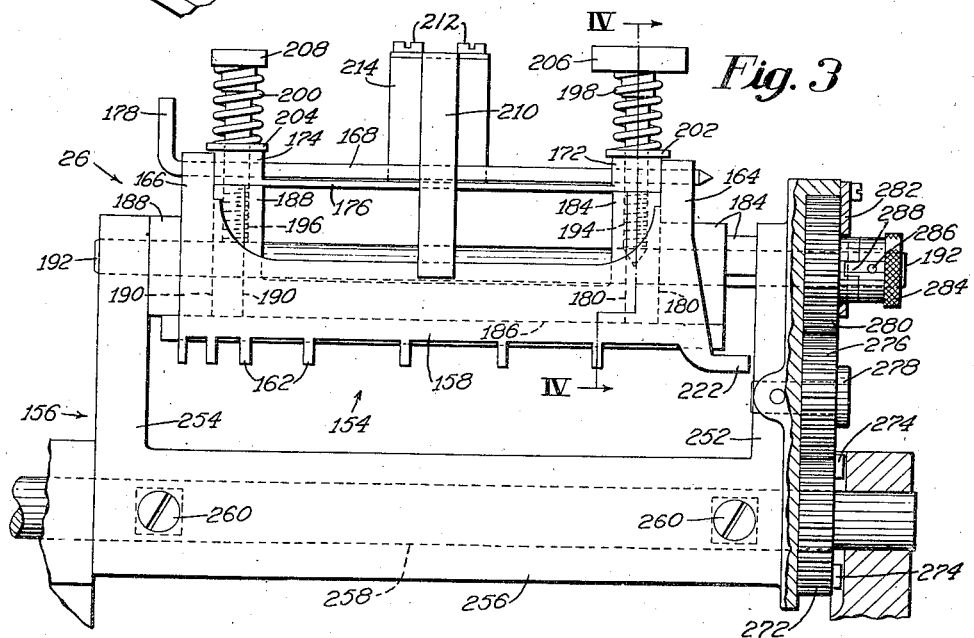
Fig. 3 is a front elevation of the mechanism for transferring a length of tape from the locality at which the tape is applied to a work piece.

The transfer mechanism 26, best shown in Figs. 3, 4, and 5, comprises a device 154 for grasping the length of tape to be applied to the work piece and, in addition, a rocking carrier 156 upon which the grasping device is mounted. The device 154 comprises a pair of depending jaws 158 and 160, each jaw having a plurality of downwardly extending teeth 162 (Fig. 3). These teeth 162 are spaced closer to each other adjacent to the left end of the grasping device to insure adequate grasping of short lengths of tape. The jaw 158 has a pair of spaced upwardly extending ears 164 and 166 by which it is pivotally hung upon a pin 168 extending transversely of the machine, and the jaw 160 has a similar pair of ears by which it is pivotally hung upon a pin 170, the two pins being parallel and both being mounted (Fig. 3) in lugs 172 and 174 integral with a bar 176. Each of the pins 168 and 170 has an upturned portion 178 adjacent to one of its ends to facilitate disassembly for cleaning adhesive from the jaws 158 and 160. The pins 168 and 170 are held in operating position by leaf spring detents engaging flat surfaces on the pins. A portion of one of these detents is indicated by the reference numeral 175 on Fig. 1. The bar 176 extends parallel to the pins and has, extending downwardly from the lug 172, a pair of guide flanges 180 and 182 which slidably engage guideways formed in the sides of a block 184 at the right-hand end of a cross piece 186. The bar 176 has another pair of guide flanges, similar to the flanges 180 and 182 and extending downwardly from the lug 174 in engagement with guideways formed in a block 188 at the left-hand end of the cross piece 186, one of the guide flanges of the second-mentioned pair being indicated on Fig. 3 by the reference numeral 190. The cross piece 186 extends parallel to the bar 176 and the pins 168 and 170. The integral member comprising the blocks 184 and 188 and the cross piece 186 is non-rotatably secured upon a shaft 192, which passes through bores in the blocks, by a setscrew 194 threaded downwardly into the block 184 and having a smooth shank portion which extends upwardly through a bore in the lug 172 to accommodate heightwise sliding of the lug. A screw 196 threaded downwardly into the block 188 has a smooth shank portion extending upwardly through a bore in the lug 174 to accommodate heightwise sliding of that lug.

The lugs 172 and 174 carrying the pins 168, 170, and therefore the jaws 158 and 160, are normally held down by compression springs 198 and 200 which surround the smooth portions of the shanks of the setscrew 194 and the screw 196 and which, at their lower ends, engage washers 202 and 204 abutting the lugs 172 and 174. The springs 198 and 200, at their upper ends, engage heads 206 and 208 formed upon the top portions of the screws 194 and 196, respectively. It is evident that the springs 198 and 200 normally hold the lugs 172 and 174 down in contact with the tops of the blocks 184 and 188 but that they can yield to permit upward movement of the lugs 172 and 174 and therefore of the jaws 158 and 160. For convenience in assembling and disassembling, the screw 196 is not made to serve as a setscrew, for which purpose the screw 194 is sufficient.

The jaws 158 and 160 are urged toward each other by a leaf spring 210 (Figs. 2 and 3) which is in the form of an inverted U, the connecting portion of the spring 210, which is uppermost, being secured by screws 212 to a post 214 extending upwardly from the bar 176. The downwardly extending resilient arms of the spring 210 embrace the jaws 158 and 160 and urge them toward each other. Secured to the under surface of the cross piece 186 and the blocks 184 and 188 by screws 216 is a pad or cushion 218 (Figs. 4 and 5) in the form of a strip of rubber, or like material, for engaging the upper surface of the tape T. A longitudinal groove 220 is formed in the pad 218 directly above the locality at which the applicator edge 114 engages the tape T.

The jaw 158 at its lower right-hand corner, as shown best in Fig. 3, has an extension 222 and the jaw 160 (Figs. 4 and 5) has a similar extension 224. Secured upon the upstanding arm 38 on the right side wall (Fig. 1) of the housing 36 is a bracket 226 having bearing holes for a pair of pins 228 and 230 which extend from and constitute pivotal mountings for a pair of arms 232 and 234, normally urged toward each other by a tension spring 236. Movement of the arms 232 and 234 toward each other is limited by stops 238 (Fig. 5) formed upon the arms which engage a plate 240 held in place by a screw 242. Carried by the arm 232 is a cam 244 and carried by the arm 234 is a similar cam 246. The purpose of these cams is to separate the jaws 158 and 160 when they are being moved by mechanism, later to be described, into position for grasping the tape which is supported by the wire 14. As the grasping device 154 (Fig. 4) moves downwardly over the cams, the extensions 222 and 224 will engage outer faces 248 and 249 on the respective cams 244 and 246, and will be wedged apart by the camming action of these outer surfaces. The jaws will thus be opened against the force of the leaf spring 210 to a width greater than that of the tape T and continued downward movement of the grasping device will bring the extensions 222 and 224 below their respective cams, thereby releasing the jaws to the action of the leaf spring 210. The jaws 158 and 160 will thereupon close upon the tape. As the grasping device moves upwardly carrying the tape with it, the extensions 222 and 224 will engage inner faces 250 and 251 on the respective cams 244 and 246, causing the two cams to yield apart and thereby permit the grasping device 154 to rise.

The shaft 192 of the grasping device 154 is journaled at its respective ends in the rocking carrier 156 comprising a pair of arms 252 and 254 extending integrally from a sleeve 256 which is non-rotatably secured upon a shaft 258 by setscrews 260 (Fig. 3). One cutting blade 20 is mounted on the arm 254 while the coacting blade 22 is carried by the housing 36. The shaft 258 is journaled from free rotation in the bearing lug 40 and the arm 38. Secured upon the left-hand end portion of the shaft 258 is a gear 262 (Fig. 1) which meshes with a gear segment 264 mounted upon a shaft 266 journaled in a bearing formed in the left side wall of the housing 36. Oscillatory movement of the gear segment 264 is affected through a yieldable connecting rod 268 pivotally connected at one end to the gear segment 264 and at its other end to a crank 270 extending from the countershaft 82. The yieldable connecting rod 268 is in all respects similar to the telescopic rod and sleeve assembly comprising the members 80 and 84 together with the spring 84 of the machine disclosed in Letters Patent No. 2,383,539. An arcuate slot (not shown) is formed in the gear segment 264 to provide passage for the tape to the feed rolls 10 and 12. It may be noted that Letters Patent No. 2,383,539 discloses a gear 90 having an arcuate slot for a similar purpose.

Because the tape must be delivered by the transfer mechanism 26 in a plane parallel to that of the inclined work table, means shown in Fig. 3 are provided for tilting the tape grasping device 154 through an angle to insure the proper laying down of the tape upon the work piece. To this end a gear 272, having radial keys 274 which engage slots in the right-hand bearing arm to hold the gear stationary, is rotatably mounted upon the shaft 258. An idler gear 276 freely rotatable upon a stub shaft 278 secured in the arm 252 meshes with the gear 272 and also with a gear 280 connected, as later described, to the shaft 192. The gear 280 is held on the arm 252 by a cover 282. As the shaft 258 is oscillated by the gear 262 (Fig. 1), the stationary gear 272 will transmit rotation through the gears 276 and 280 to the shaft 192 and will tilt the bar from a position wherein the under surface of the rubber cushion 218 is horizontal, for picking up the tape, to a position wherein said under surface has the same inclination as that of the work table for laying the tape upon the work piece. In the illustrated machine, the work table is inclined upon an angle of 10° from the horizontal and the gears 272, 276 and 280 are provided with 18, 18, and 19, teeth respectively. A collar 284 secured upon the right-hand end portion of the shaft 192 by a pin 286 and having a knurled head is coupled, through a tongue-and-groove connection 288, to a boss extending axially from the face of the gear 280. The coupling permits withdrawal of the shaft 192 and facilitates registry of the setscrew 194 with a suitable recess in the shaft when the shaft is reinserted.

The construction of the grasping device 154 is such as to enable it without fail to pick up a length of tape T from the wire 14 and apply it to the shoe part S. To this end, the lower portions of the jaws 158 and 160, including the teeth 162, are bowed inwardly toward each other to insure against the grasped tape dropping away from the cushion 218 while the tape is being transferred. As the grasping device descends to lay the tape T upon the shoe part S, the tips of the teeth 162 will engage the shoe part and the springs 198 and 200 will yield to permit the cushion 218 to descend further and press the tape upon the shoe part. After the tape has thus been applied to the shoe part, the grasping device rises, first lifting the cushion 218 from the tape and then lifting the teeth 162 from the shoe part. To insure disengagement of the teeth from the tape, the tips of the teeth, as shown in Figs. 4 and 5, are beveled inwardly.

The cushion 218 is slightly narrower than the width of the tape to enable the jaws 158 and 160 to close upon the edges of the tape under pressure of the leaf spring 210, the excess width of the tape being insufficient to cause the tape to buckle. If desired, the upper surface of the cushion may be faced with a steel strip, not shown. If the operation is to be performed upon tapes of different widths, interchangeable cushions of appropriate width may be provided.

It may be desirable, if light weight tape is used, to provide a device for lifting the leading end of the tape to overcome sagging after the tape has passed the feed rolls 10 and 12. Such a device is shown in Fig. 1. It consists of a small table 290 having a depending stem 292 which is guided for heightwise movement. A spring (not shown) normally holds the table 290 up in a stop position high enough to insure that the leading end of the tape will advance on a level slightly higher than that of the wire 14. When the transfer mechanism 26 is down in tape-grasping position, a lug (not shown) extending from the arm 254 holds the table 290 below the level of the leading end of the next length of tape to be advanced. Now, as the arm 254 begins to rise, the leading end of this next length of tape advances over the table 290 and is raised by the table as the arm 254 continues to rise.

The operation of the machine will now be described. While the clutch 90 is disengaged and the machine is at rest, the tape transfer mechanism 26 will be in the up position shown in Figs. 2, 3 and 4. When the operator starts the machine by tripping the clutch, the grasping device 154 will be brought down into tape-grasping position. As the rocking carrier 156 causes it to descend, the jaws 158 and 160 will be opened by the cams 244 and 246, and then the jaws will be released to grasp the tape. Meanwhile, during the final portion of the descent of the transfer device, the upper cutting blade 20, cooperating with the lower blade 22, will sever the predetermined length of tape. While the tape is held down upon the wire 14 by the cushion 218, the applicator 18 rises and the operative edge 114 of the applicator carries some of the adhesive in the receptacle 16 up with it and applies the adhesive to the under surface of the tape. Now, as the countershaft 82 continues to rotate, the oscillatory shaft 258 will reverse its movement, carrying the tape grasping device 154 through an arcuate path into the position shown in Fig. 5 and tilting the grasping device to an inclination corresponding to that of the work table 24. As the grasping device descends above the work table the ends of the teeth 162 on the jaws 158 and 160 will engage the work piece and the jaws will yield upwardly while the springs 198 and 200 compress. Downward pressure of the blocks 184 and 188 and the cross piece 186 will be transmitted through the cushion 218 and will apply the adhesively coated tape to the work piece. Continued rotation of the countershaft 82 will return the grasping device 154 to its at rest position as shown in Figs. 2 and 4, whereupon the clutch will automatically disengage.

The advancing of a fresh piece of tape of a length determined by the setting of the gage 32, before completion of the cycle of operations, and any changing of the length of the advanced tape by resetting of the gage 32 after the machine has come to rest, are performed by mechanisms similar to those disclosed in Letters Patent No. 2,383,539.

Having described my invention, what I claim as new and desire to secure by Letters Patent of the United States is:

1. In a machine for adhesively applying tape to a shoe part, means for supplying a length of tape to a position in a predetermined plane, a work table in a plane inclined to that of the supplied tape, a device for grasping the length of supplied tape, a pivotally mounted carrier upon which said grasping device is pivotally mounted, said carrier being constructed and arranged to swing the grasping device through an arcuate path from a position in which it can grasp the length of supplied tape to a position in which it can deliver the length of tape upon a work piece on said work table, and gearing for rotating the grasping device to cause the length of tape to be delivered at an inclination corresponding to that of the work table.

2. In a machine for adhesively applying tape to a shoe part, means for supplying a length of tape to a position in a predetermined plane, a work table in a plane inclined to that of the supplied tape, a device for grasping the length of supplied tape, a shaft upon which said grasping device is mounted, means for controlling the angular position of said grasping device with respect to said shaft, a carrier in which said shaft is journaled for rotation, a shaft upon which said carrier is mounted for swinging movement, means for preventing relative rotation between the second mentioned shaft and said carrier, a support in which the second mentioned shaft is journaled, means for oscillating the second mentioned shaft to cause the carrier to swing the grasping device through an arcuate path from a position in which it can grasp the length of supplied tape to a position in which it can deliver the length of tape upon a work piece on said table, a gear fixed on the first mentioned shaft, a gear fixed on the second mentioned shaft, and idler gearing on said carrier meshing with said gears for transmitting rotary oscillation from the second mentioned shaft to the first mentioned shaft to tilt the grasping device from grasping position to an inclination corresponding to that of the work table.

3. In a machine for adhesively applying tape to a shoe part, a movable carrier supporting a pair of opposed members for grasping between them a length of tape, means for urging said grasping members toward each other to cause them to grasp the tape by engagement with its lateral edges, a pair of cams mounted for relative movement of approach and separation and positioned in the path of movement of said carrier, said cams being constructed and arranged to spread apart said grasping members as the carrier moves them into grasping position and then to release the grasping members to the action of said urging means, thereby enabling the grasping members to grasp the tape, and means permitting the cams to yield to avoid interference with the grasping members as they transfer the tape upon movement of the carrier.

HARRY D. ELLIOTT.

REFERENCES CITED

The following references are of record in the file of this patent:

UNITED STATES PATENTS

| Number | Name | Date |
|---|---|---|
| 900,816 | Woodland | Oct. 13, 1908 |
| 974,326 | Woodland | Nov. 1, 1910 |
| 1,086,572 | Weiss | Feb. 10, 1914 |